United States Patent [19]

Hirosawa et al.

[11] Patent Number: 4,744,050
[45] Date of Patent: May 10, 1988

[54] METHOD FOR AUTOMATICALLY REGISTERING FREQUENTLY USED PHRASES

[75] Inventors: Toshio Hirosawa, Machida; Tutomu Itoh, Hachioji; Tetsuzou Uehara, Tokyo; Junichi Kurihara, Hachioji, all of Japan

[73] Assignee: Hitachi, Ltd., Tokyo, Japan

[21] Appl. No.: 748,907

[22] Filed: Jun. 26, 1985

[30] Foreign Application Priority Data

Jun. 26, 1984 [JP] Japan .................. 59-129950

[51] Int. Cl.[4] ........................... G06F 15/38
[52] U.S. Cl. ...................... 364/900; 364/419
[58] Field of Search ... 364/200 MS File, 900 MS File, 364/419

[56] References Cited

U.S. PATENT DOCUMENTS

| | | | |
|---|---|---|---|
| 4,339,806 | 7/1982 | Yoshida | 364/900 |
| 4,438,505 | 3/1984 | Yanagiuchi et al. | 364/900 |
| 4,468,756 | 8/1984 | Chan | 364/900 |
| 4,481,607 | 11/1984 | Kobayashi et al. | 364/900 |
| 4,499,554 | 2/1985 | Kobayashi | 364/900 |
| 4,502,128 | 2/1985 | Okajima et al. | 364/900 |
| 4,544,276 | 10/1985 | Horodeck | 400/110 |
| 4,559,598 | 12/1985 | Goldwasser et al. | 364/419 |
| 4,567,573 | 1/1986 | Hashimoto et al. | 364/900 |
| 4,630,235 | 12/1986 | Hashimoto et al. | 364/900 |
| 4,641,264 | 2/1987 | Nitta et al. | 364/900 |

Primary Examiner—Gareth D. Shaw
Assistant Examiner—Maria Napiorkowski
Attorney, Agent, or Firm—Antonelli, Terry & Wands

[57] ABSTRACT

Phrases in an input character string are registered in a table (phrase table), frequencies of occurrence of those phrases are counted and registered in the table, the phrases having high frequencies of occurrence are selected and macro codes therefor are determined, and those macro codes and the corresponding phrases are paired and registered in the macro table. A content of the macro table thus prepared may be displayed on a display screen. Thereafter, a user can enter a desired phrase by keying the corresponding macro code.

9 Claims, 10 Drawing Sheets

FIG. 3

| KANA REPRESENTATION (READING) | KANJI REPRESENTATION (PHRASE) | FREQUENCY | FLAG |
|---|---|---|---|
| ハツオン | 発音 | 2 | 0 |
| ドウイツ | 同一 | 3 | 1 |
| カンジ | 漢字 | 5 | 1 |
| テイケイク | 定型句 | 3 | 1 |
| ドウオンイギゴ | 同音異義語 | 3 | 1 |
| ヒョウジ | 表示 | 1 | 0 |
| センタク | 選択 | 1 | 0 |
|  |  |  |  |

FIG. 4

| ML | MCODE | EL | ESTRING |
|---|---|---|---|
| 2 | ドウ | 4 | 同一 |
| 2 | カン | 4 | 漢字 |
| 2 | テイ | 6 | 定型句 |
| 3 | ドウオ | 10 | 同音異義語 |
|  |  |  |  |
|  |  |  |  |

METHOD FOR AUTOMATICALLY REGISTERING FREQUENTLY USED PHRASES

BACKGROUND OF THE INVENTION

The present invention relates to a text processor and more particularly to processing of frequently used phrases.

In an input method of a Japanese sentence in a text processor, a so-called Kana-to-Kanji conversion method for converting input Kana or Roman characters to a corresponding Kanji character is a main conversion method. One problem encountered in a course of document formation by the Kana-to-Kanji conversion method is trouble in repeatedly keying Kana characters or Roman characters for the same phrase which frequently appears in one document. For a beginner who does not learn by heart the arrangement of Kana keys or alphabet keys on a keyboard, the trouble may be more than that which could be imagined by a third person. As one approach to resolve this problem, an input function by a macro code is usually imparted to the text processor. In this method, a user enters a relatively small number of selected phrases by special keys (so-called constant pattern phrase keys) or abbreviations and the text processor automatically converts them to desired phrases.

The above function in the prior art text processor is, however, not an easy-to-use one. The user must select a certain number of phrases and assign special keys to those phrases or determine abbreviations therefor, and register the relations thereof in the text processor in terms of predetermined sequences. The registration work itself is troublesome, and it is not easy to predict what phrases will be frequently used in a document to be prepared. If a draft is previously prepared and it is finally composed by the word processor, the input function by the macro code may work relatively well but it will be of no use if a document is to be prepared by the word processor without a draft.

SUMMARY OF THE INVENTION

It is an object of the present invention to automate registration of phrases for the input function by the macro codes to enhance utility of the function.

The input function by the macro codes is attained by preparing in a text processor a table (macro table) which contains a relationship between phrases and codes of corresponding keys, abbreviations or symbols (macro codes). In the present invention, phrases in an input character string are registered in a table (phrase table), frequencies of occurrence of those phrases are counted and registered in the table, the phrases having high frequencies of occurrence are selected and macro codes therefor are determined, and those macro codes and the corresponding phrases are paired and registered in the macro table. A content of the macro table thus prepared may be displayed on a display screen. Thereafter, a user can enter a desired phrase by keying the corresponding macro code.

In determining the macro code for an abbreviation, characters are sequentially extracted from a top of an input character string (in Kana character notation or Roman character notation) of the phrase and when a character string which has not yet been registered as an abbreviation for another phrase appears, it is registered as the abbreviation for that phrase. When a key code is used as a macro code (for example, each phrase is allotted to one phrase key), a key code corresponding to an entry number (address) at a vacant area in the macro table is registered as the macro code.

BRIEF DESCRIPTION OF THE DRAWINGS

FIG. 3 shows a format of a phrase table, FIG. 4 shows a format of a macro table.

DESCRIPTION OF THE PREFERRED EMBODIMENTS

Figure 2:
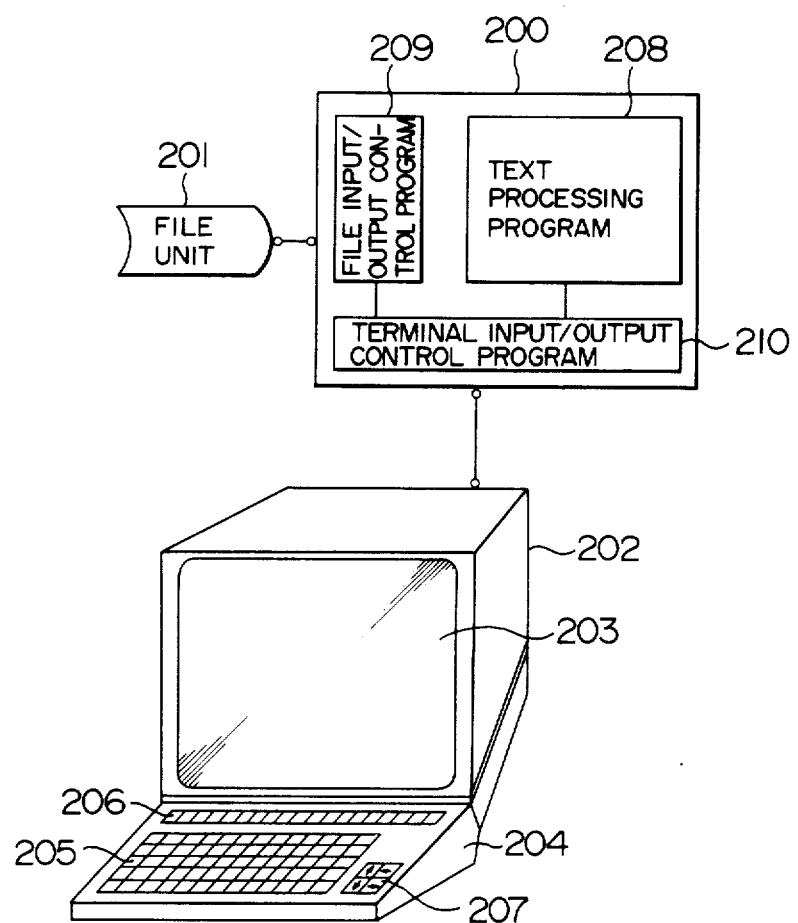
FIG. 2 is a block diagram of a configuration of the text processor of FIG. 1.

FIG. 2 shows a configuration of a Japanese text processor in accordance with the present invention. The processor comprises a processing unit 200, a file unit 201 and a terminal unit 202. Those units may be assembled in one independent system, or the processing unit 200 and the file unit 201 may constitute a central processing unit to which any number of terminal units 202 may be connected.

The file unit 201 stores texts and a dictionary therein. The terminal unit 202 has a display screen 203 and a keyboard 204 which has alphanumeric, Kana and special character keys 205, function keys 206 and cursor shift keys 207. The processing unit 202 executes text processing programs 208–210 stored in a memory of the processing unit 200 and supervises the entire system. The processing unit 200 comprises an arithmetic operation circuit, a control circuit, a main memory and an input/output control circuit, although major functional components are shown in FIG. 2.

Figure 10:
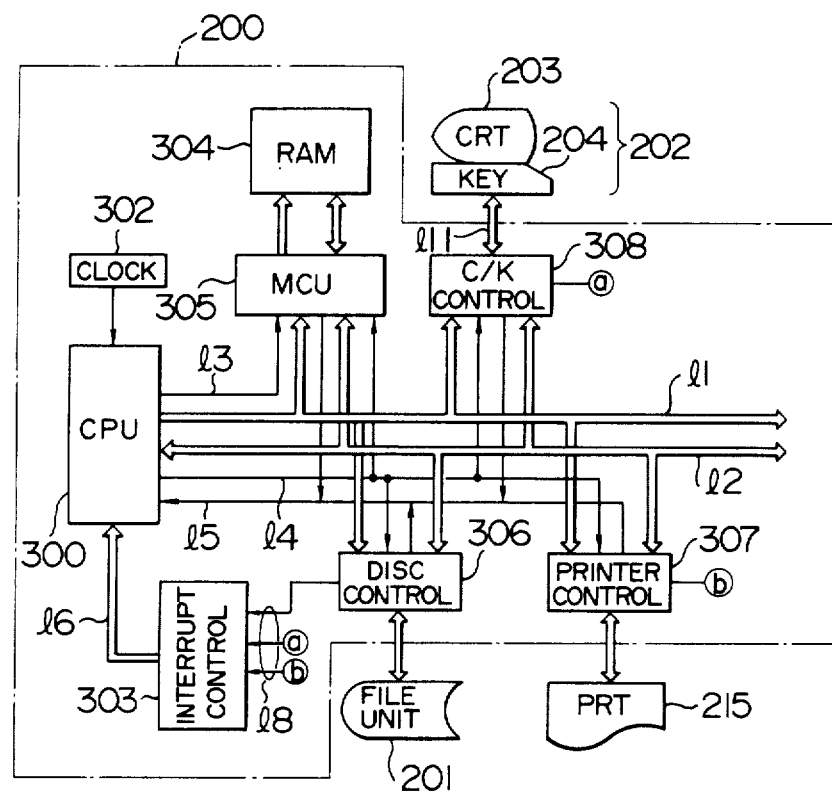
FIG. 10 shows a configuration of a microprocessor system in which the text processing system of the present invention is applied.

FIG. 10 shows a configuration of the processing unit 200 of FIG. 2, and a connection thereof with the terminal unit 202, the file unit 201 and a printer unit 215. A block shown by chain lines in FIG. 10 is the processing unit 200. Numeral 300 denotes a microprocessor (CPU), numeral 302 denotes a clock generator (CLOCK), numeral 303 denotes an interrupt control circuit, numeral 304 denotes a main memory (RAM) which stores therein, the text processing program 208, the file input/output control program 209 and the terminal input/output control program 210, numeral 305 denotes a memory control unit (MCU) for the RAM 304, numeral 306 denotes a disk control circuit, numeral 201 denotes the file unit shown in FIG. 2, numeral 307 denotes a printer control circuit, and numeral 308 denotes a control circuit for the terminal unit 202 which comprises the display screen 203 and the keyboard 204.

The CPU 300 in the processing unit 200 and other circuits are connected through a 24-bit width address bus 11, a 16-bit or 32-bit width data bus 12, control signal lines 14 and response signal lines 15. In addition, a signal to select read from the memory (RAM) 304 or write to the RAM 304 is sent from the CPU 300 to the MCU 305 through a line 13.

An interrupt request from the input/output control circuit is supplied from a signal lines 18 to the CPU 300 by an interrupt line bus 16 through the interrupt control circuit 303.

Characters entered by the keyboard 204 of the terminal unit 202 are supplied to the control circuit 308 through a signal lines 111 and thence to the CPU 300 through the data bus 12. The control circuit 308 reports the character input iterruption to the interrupt control circuit 303 through the signal lines 18. The interrupt control circuit 303 produces an interrupt priority signal based on the interrupt report from the interrupt report signal lines 18 and sends out the signal to the signal lines 16. The CPU 300 determines that it is the input from the keyboard 204 based on the interrupt priority and executes the processing program stored in the RAM 304. The processing program is the terminal input/output control program 210 shown in FIG. 2.

As the processing program 210 is executed, a unit address of the control circuit 308 is sent out to the address bus 11 from the CPU 300 and a read command signal to the sigal lines 14 is issued. Thus, one character is sent to the data bus 12 from the control circuit 308 and is read into the CPU 300. This step is repeated so that a character string of data is read into the data buffer in the terminal input/output control program.

When the Kana or Kanji characters are to be displayed on the screen 203, the terminal input/output control program 210 of FIG. 2 is also executed and the content in the display screen buffer in the RAM 304 is sequentially sent to the data bus 12 from the CPU 300. Thus, the data to be displayed on the screen is displayed on the display screen 203 through the control circuit 308 and the signal line 111. At this time, an address of the control circuit 308 is sent out to the address bus 11.

The read and write control of the data stored in the file unit 201 is carried out by the file input/output control program 209 shown in FIG. 2, stored in the RAM 304. The data stored in the file unit 201 is read and written between the disk control circuit 306 and the MCU 305, RAM 304 through the data bus 12. The CPU 300 controls the start and termination of the data transfer.

Referring again to FIG. 2, the text processing program 208 converts the Kana character string entered by the keys 205 of the keyboard 204 to Kanji characters, by referring to the dictionary in the file unit 201 as required, and displays the resulting character string on the display screen 203 or stores it in the file unit 201 as a text file. The text processing program 208 includes a phrase table to be described later, and phrases in the input character string are registered in the phrase table and the frequencies of appearance of the phrases are also registered. The file input/output control program 209 controls transfer of the text data and the dictionary data between the processing unit 200 and the file unit 201. The terminal input/output control program 210 reads the character codes and the function codes from the keyboard 204 into the processing unit 200 and displays the processed character string, command information, content of the file 201 or content of the macro table on the display screen 203.

The frequent phrase processing program resides in the text processing program 208. It selects the phrases having high frequencies of occurence from the phrase table 16 shown in FIG. 1 in the text pocessing program 208, determines macro codes therefor and registers them in the macro table 13 shown in FIG. 1. It reads out the phrase corresponding to the keyed-in macro code and supplies it to the text processing program 208. In response to an instruction by a user, it sends the content of the macro table 13 to the terminal input/output control circuit 210 to display it on the screen 203.

It is easy to memorize if a leading portion of the Kana or Roman character string of the phrase is used as an abbreviation to determine the macro code. The input mode in which the macro code is used is hereinafter referred to as an abbreviation mode. In the abbreviation mode, the user enters the abbreviation and then depresses a specific function key (abbreviation key). When a conventional Kana-to-Kanji conversion is to be performed, a Kana or Roman character string which represents the pronounciation of a desired Kanji character is entered and then a Kana-to-Kanji conversion key is depressed.

Figure 1:
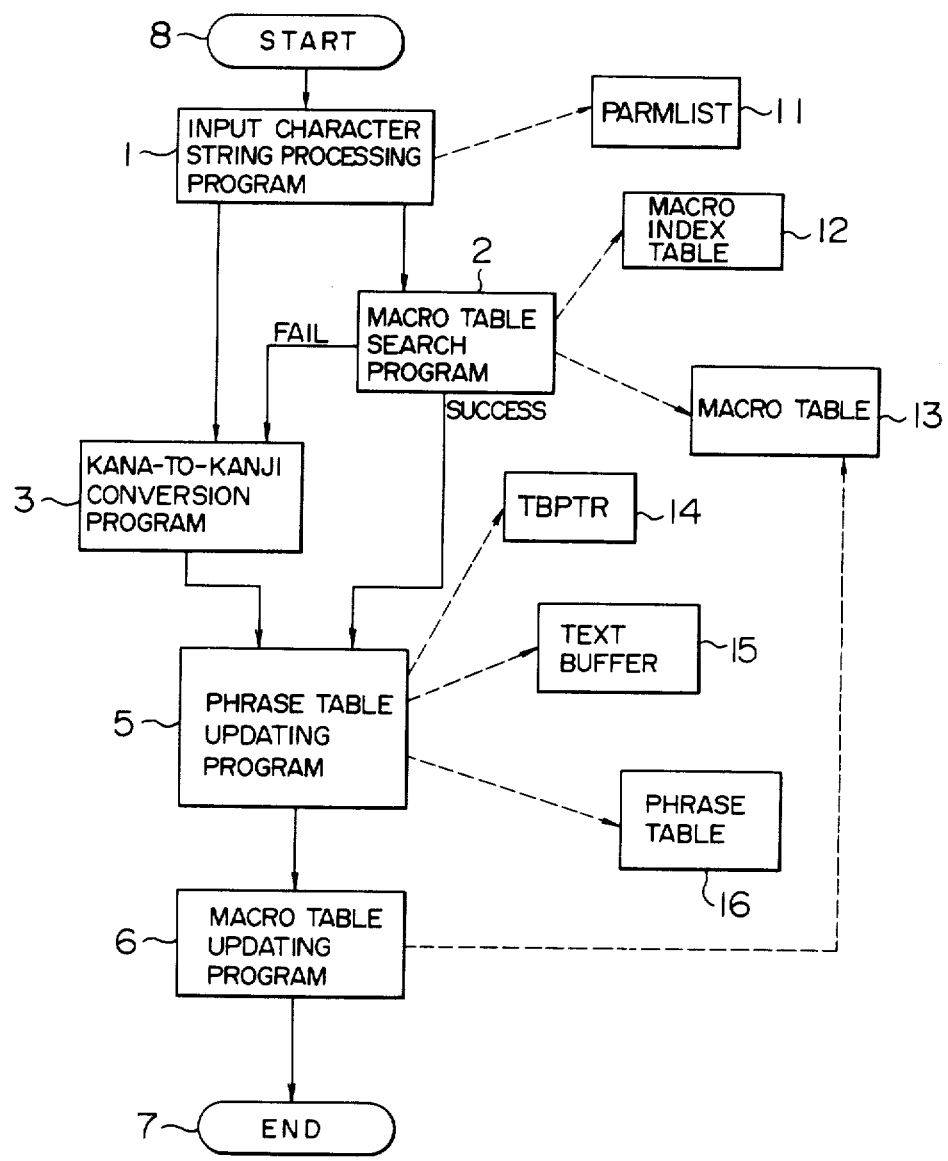
FIG. 1 is a block diagram of a processing program and a control table of a text processor according to the present invention.

FIG. 1 shows a detail of the text processing program 208 shown in FIG. 2. Numerals 1-3 and 5-8 denote processing programs and numerals 11-16 denote control tables and text buffer or the like in the RAM 304, which are used in the course of text processing. In FIG. 1, the macro table search program 2, the phrase table frequency updating program 5, the macro table updating program 6, the tables 11-14 and the phrase table 16 relate to the present invention.

Referring to FIG. 1, the character string entered by the keyboard 204 of FIGS. 2 and 10 is supplied to the input character string processing program 1 of FIG. 1 through the terminal input/output control program 210 of FIG. 2. The input character string processing program 1 temporarily stores the character string data into the text buffer 15 and passes the control to the macro table search program 2 if the abbreviation mode is designated. The macro table search program 2 selects a character string corresponding to input macro code characters by referring the macro index table 12 and the macro table 13 and stores the result in the PARMLIST 11, which is a parameter list in the course of text processing and which is used by the input character string processing program 1, the macro table search program 2, and the Kana-to-Kanji conversion program 3.

If a character string not included in the macro code is entered in the abbreviation mode, the processing by the macro table search program 2 fails. In this case, the character string is converted by the Kana-to-Kanji conversion program 3. If a macro development command code is not included in the character string, the control is passed to the Kana-to-Kanji conversion program 3. This will be explained later in detail with reference to FIG. 8.

After the conversion of the character string data by the macro table search program 2 or the Kana-to-Kanji processing program 3, the phrase table updating program 5 is executed. The program 5 stores the converted character string into an area in the text buffer 15 in accordance with the pointer control table 14 (TBPTR) which controls the text buffer 15.

In order to count the frequency of occurrence of the character string converted by the programs 2 or 3, the frequency field in the phrase table 16 is counted up. The Kana-to-Kanji conversion program also supplies Kana representation codes, Kanji representation codes and word/phrase discrimination information to the processing program 5.

After the phrase table 16 has been updated, the macro table updating program 6 is executed. The macro table updating program 6 looks up the phrase table 16 to select the character strings having high frequencies of occurrence and register those character strings in the macro table 13.

At a step 7 (END), the conversion of the character string entered by the keyboard 204 is terminated and the conversion of the next character string is started at a step 8 (START).

In this manner, a sequence of steps of the text processing program 208 shown in FIG. 2 are completed. The content of the text buffer 15 can be displayed on the display screen 203 of FIG. 2.

FIG. 3 shows a detail of the phrase table 16 shown in FIG. 1. In the phrase table 16, phrases so far appearing in the text under composition are registered in a Kana representation field 35 and a Kanji representation field 36, and frequencies of occurrence of the phases are registered in a frequency field 37. A flag field 38 contains information as to whether the phrases have been registered in the macro table 13 or not. The flag value "0" indicates that the phrase has not been registered and the flag value "1" indicates that it has been registered.

FIG. 4 shows a detail of the macro table 13. It includes an ML field 50 which indicates a length of the macro code, an MCODE field 51 which holds the macro code therein, an EL field 52 which indicates a length in bytes of an entire representation character string after the macro development, and an ESTRING field 53 which holds an entire representation character string code therein. The length is represented by the number of bytes, one Kana character has a one byte length and one Kanji character has a two-byte length.

Figure 5:
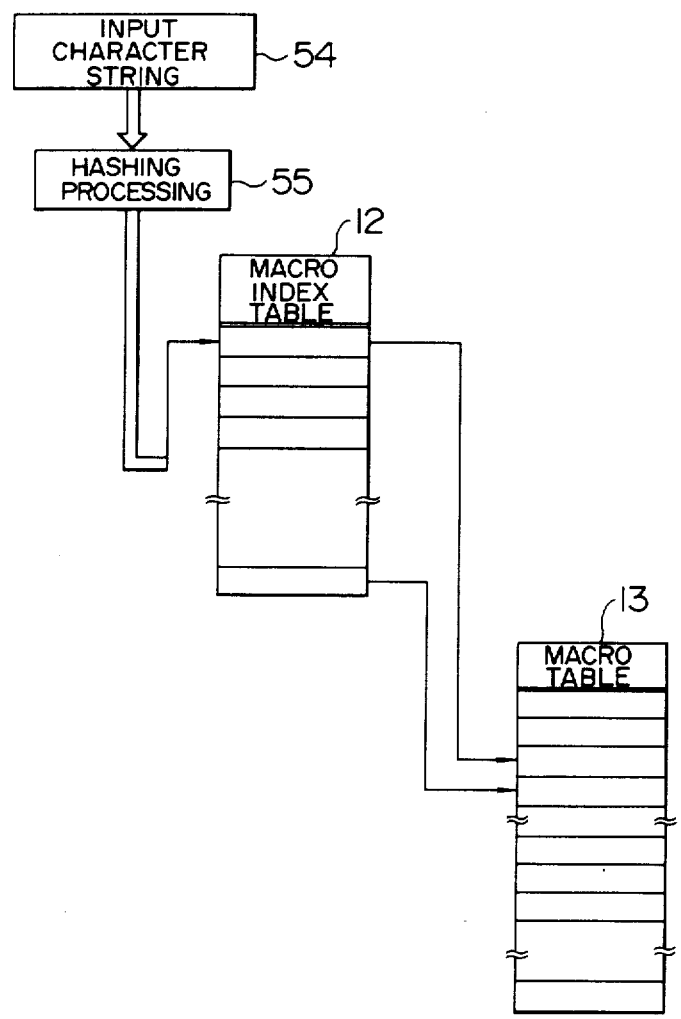
FIG. 5 illustrates accessing to the macro table.

FIG. 5 illustrates accessing to the entries of the macro table 13. In the abbreviation mode in which the phrase is designated by the macro code which is the leading portion of the Kana character string, the accessing is done through the macro index table 12. The input character code string 54 is converted to a numeral in a predetermined range by Hashing processing 55 and the numeral is used as an entry number to access the macro index table 12 which contains entry numbers of the macro table 13. This entry number is read out to access the entry in the macro table 13.

Figure 6:
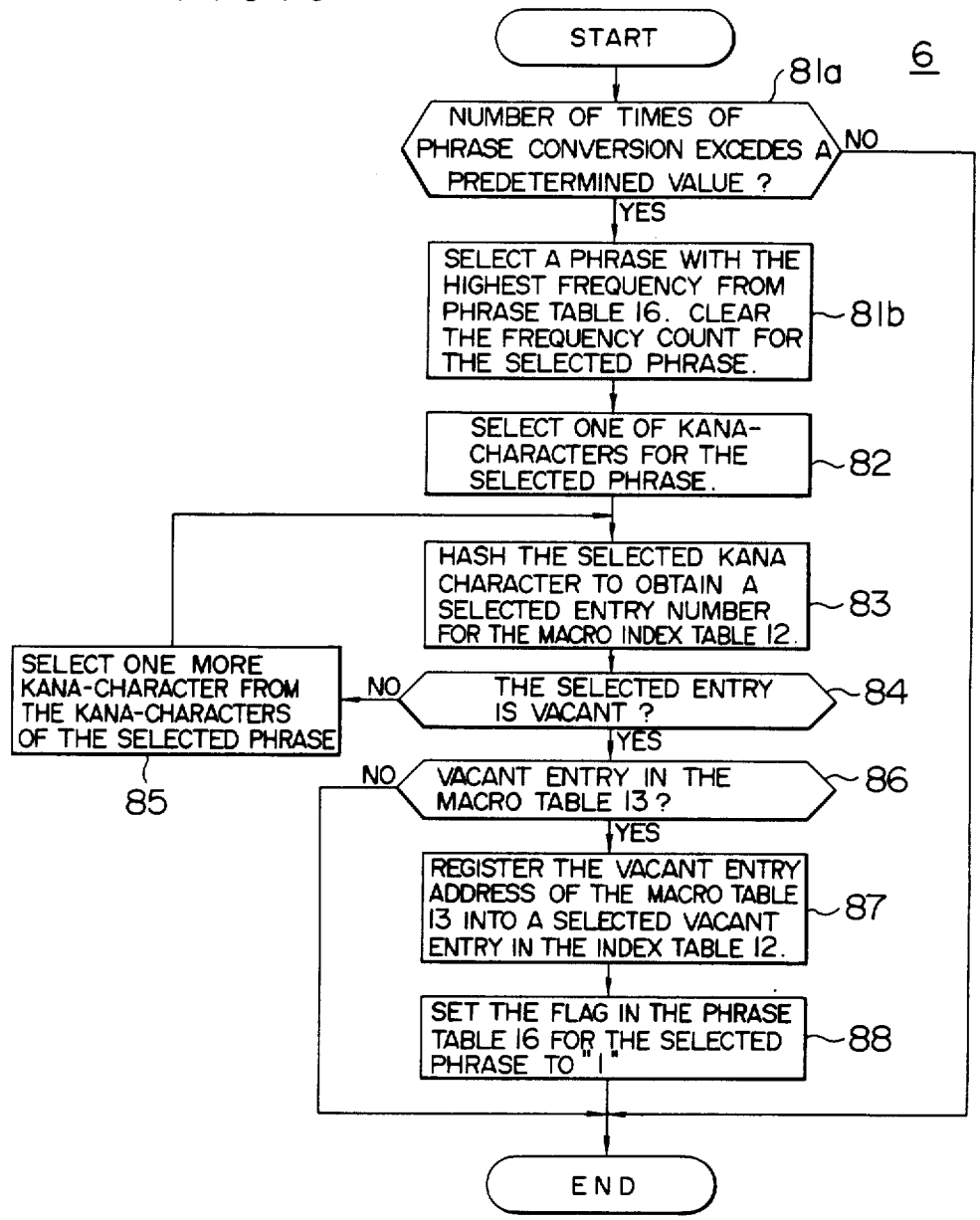
FIG. 6 is a flow chart of automatic phrase registration by a macro table updating program.

The automatic registration of the frequent phrases by the macro table updating program 6 is now explained. FIG. 6 shows a flow chart of this processing. The processing may be carried out at any time although it is effective to carry out when the content of the phrase table 16 is changed. In the embodiment of FIG. 6, it is started when the number of times of phrase conversion exceeds a predetemined number in a step 81a. Thus, the registration is made at a constant time interval. Alternatively, the phrases having frequencies of occurrence higher than a predetermined number may be selected. In this case, they are registered at each time. The frequency field 37 and the flag 38 of the phrase table 16 are checked to search the phrase in the character string which has the flag value "0" and the highest frequency (step 81b). If the value of flag 38 is "0", it indicates that the phrase has not yet been registered in the macro table 13, and if it is "1", it indicates that it has been registered.

Accordingly, the phrase having the highest frequency is selected from the unregistered phrases.

In a step 82, one of Kana characters for the selected phrase is selected, and in a step 83, a predetermined number of leading characters in the Kana character string for the phrase selected in the step 81b are selected and they are processed by the Hashing processing shown in FIG. 5. In the present embodiment, two characters are selected although more or less characters may be selected. The macro index table 12 is accessed by the entry number derived from the Hashing processing to check if that location is vacant or not (step 84). If it is not vacant, it indicates that the same Kana character string has already been registered as the macro code (abbreviation) for another phrase. Thus, the next one character is added to the character string to be processed by the Hashing processing (step 85) and the steps 83 and 84 are repeated. For example, in FIG. 4, if the phrase " 月 - " has already been registered, the phrase " 月末見本話 " cannot be registered by the macro code " ドウ " because it is identical to the macro code " ドウ " for the phrase " 月 - ". Accordingly, one character " オ " is added so that " ドウオ " is registered as the macro code. In the step 84, if the macro index table is vacant, a step 86 is executed to check whether the macro table 13 has a vacant area or not. If it is vacant, this entry number thereof is written onto the vacant area in the macro index table 12 found in the step 84 (step 87), and the phrase is registered in the vacant area of the macro table 13 found in the step 86, in accordance with the format of FIG. 4 (step 88).

Finally, the flag 38 in the entry of the phrase table 16 for the phrase registered now is set to "1" to indicate that it has been registered in the macro table 13. In the registration processing explained above, the macro code is added to the macro table. Alternatively, a plurality of phrases may be selected from the phrase table for each predetermined period and they may be registered in the macro table. In this case, the content of the macro table is once deleted and then the plurality of phrases are registered. Thus, the most recently frequently used phrases are always stored in the macro table.

In the key mode, one character entered after the single phrase code designation key is processed in the essentially same manner as above. In the above embodiment, the registration processing is terminated if the table has no vacant area. Alternatively, one of the registered phrases having a lower frequency than that of the phrase to be registered may be deleted to make a vacant area. Only those phrase having lengths longer than a predetermined length may be automatically registered.

The processing (macro development processing) for converting the input macro code to the corresponding phrase by the macro table thus prepared is now explained. The character codes entered by the alphanumeric, Kana and special character keys 205 are sequentially sent to the input character code string processing program 1 of FIG. 1, and thence stored in the text buffer 15.

The input character code string processing program 1 also searches the macro code in the input character code sequence, and when the macro code is detected, it sets necessary information in the parameter list PARMLIST 11 and passes the control to the macro table search program 2. In the abbreviation mode, the macro code is of variable length and the text buffer pointer 14 is used to determine the length.

Figure 7A:
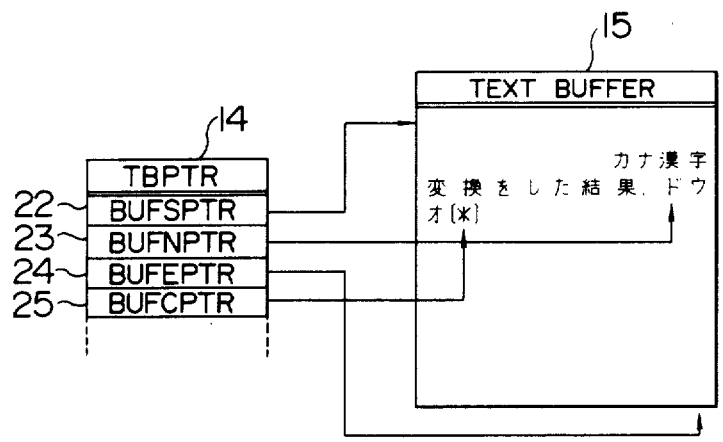
FIG. 7A shows a relationship between a format of a text buffer pointer and a text buffer.
Figure 7B:
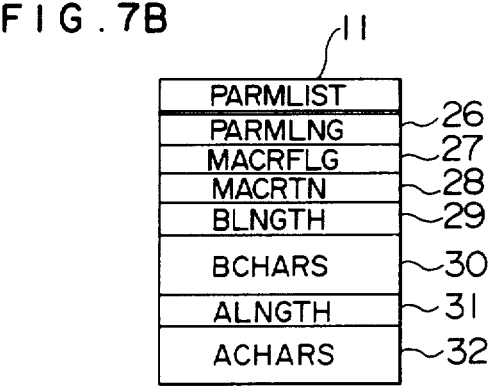
FIG. 7B shows a format of a parameter list.

FIG. 7A shows the text buffer pointer (TBPTR) 14 and the text buffer 15, and FIG. 7B shows the parameter list (PARMLIST) 11. Recorded in the text buffer pointer 14 are a text buffer start address pointer (BUFSPTR) 22, a start address pointer (BUFNPTR) 23 of a character string to be Kana-to-Kanji converted next, a text buffer end address pointer (BUFEPTR) 24, and an address pointer (BUFCPTR) 25 of the last character currently being entered. In the text buffer 15 shown, the input code " ドウオ [*]" is recorded (where [*] indicates the abbreviation key code) to indicate that " ドウオ " is the macro code for the abbreviation.

Recorded in the parameter list 11 are a list length (PARLNG) 26, a flag (MACRFLG) 27 to indicate the macro development mode, a return code (MACRTN) 28 from the macro table search processing program 2, a character string (macro code) length (BLNGTH) 30 and a character string data (BCHARS) 29 before the macro development, and a character string length (ALNGTH) 31 and a character string data (ACHARS) 32 after the macro development. The MACRFLG 27 is "1" in the abbreviation mode and "0" in other modes. The MACRTN 28 is "0" if the macro development succeeds and "1" if it fails. One of a plurality of values may be used depending on a cause of failure.

Figure 8:
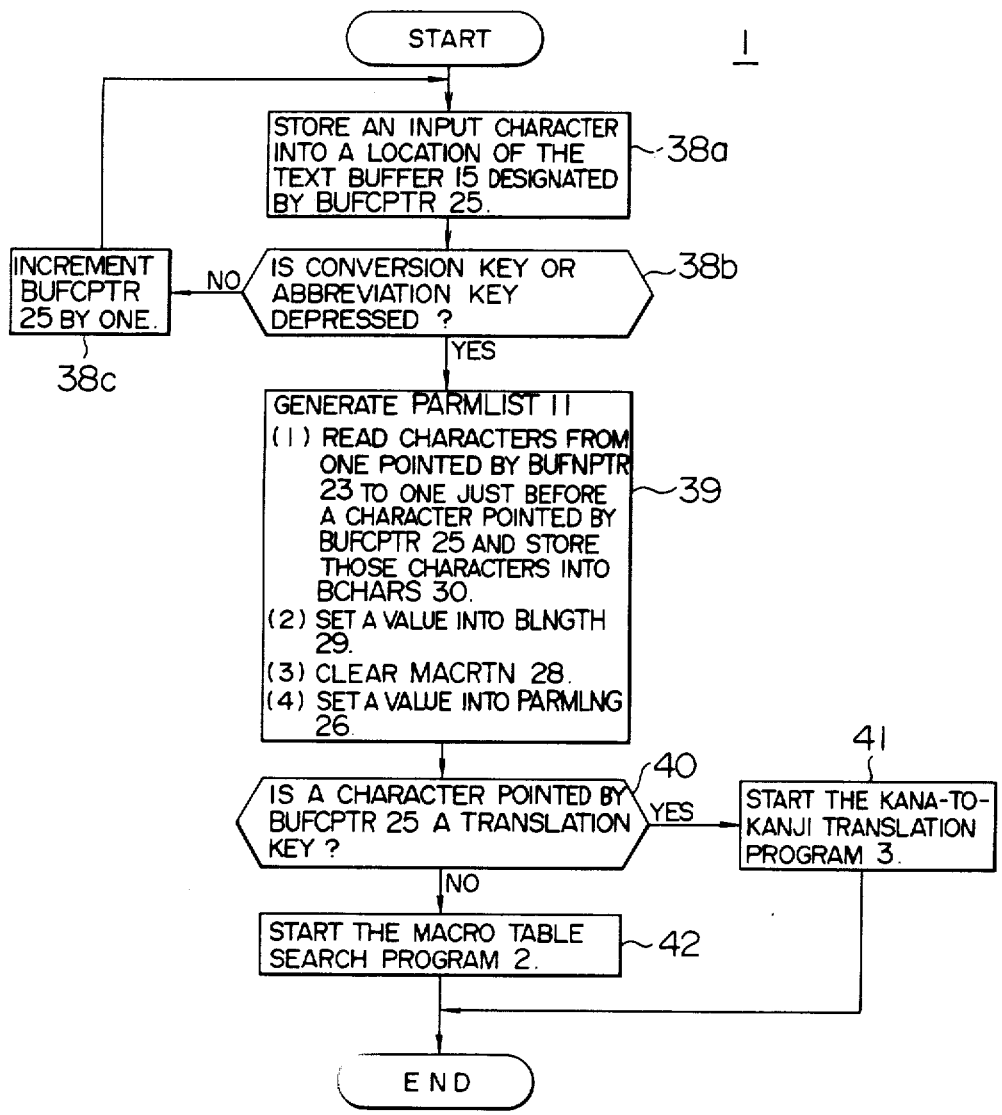
FIG. 8 is a flow chart of macro code processing by an input character code string processing program.

FIG. 8 is a flow chart of the processing by the input character string processing program 1. In a step 38a, characters are stored one by one in the text buffer 15 by the BUFCPTR 25 shown in FIG. 7. The steps 38c and 38a are repeated until the conversion key or the abbreviation key appears in the stored character code.

If a decision in a step 38b is affirmative, a step 39 is executed. Thus, the content of the PARMLIST 11 shown in FIG. 7B is set. If a decision in a step 40 indicates the Kana-to-Kanji conversion key, the Kana-to-Kanji conversion program 3 of FIG. 1 is started (step 41). If the decision indicates the abbreviation key or macro conversion, the macro table search program 2 is started (step 42).

In the Kana-to-Kanji conversion program 3 shown in FIG. 1, the Kana representation character string set in the BCHARS 30 of the PARMLIST 11 is converted to the Kanji representation character string, which is then stored in the ACHARS 32 of the PARMLIST 11. A discrimination information to discriminate whether the character string is a single word or a phrase is also set in the MACFLG 27. The Kana representation character string and the converted Kanji representation character string are set in the PARMLIST 11.

Figure 11:
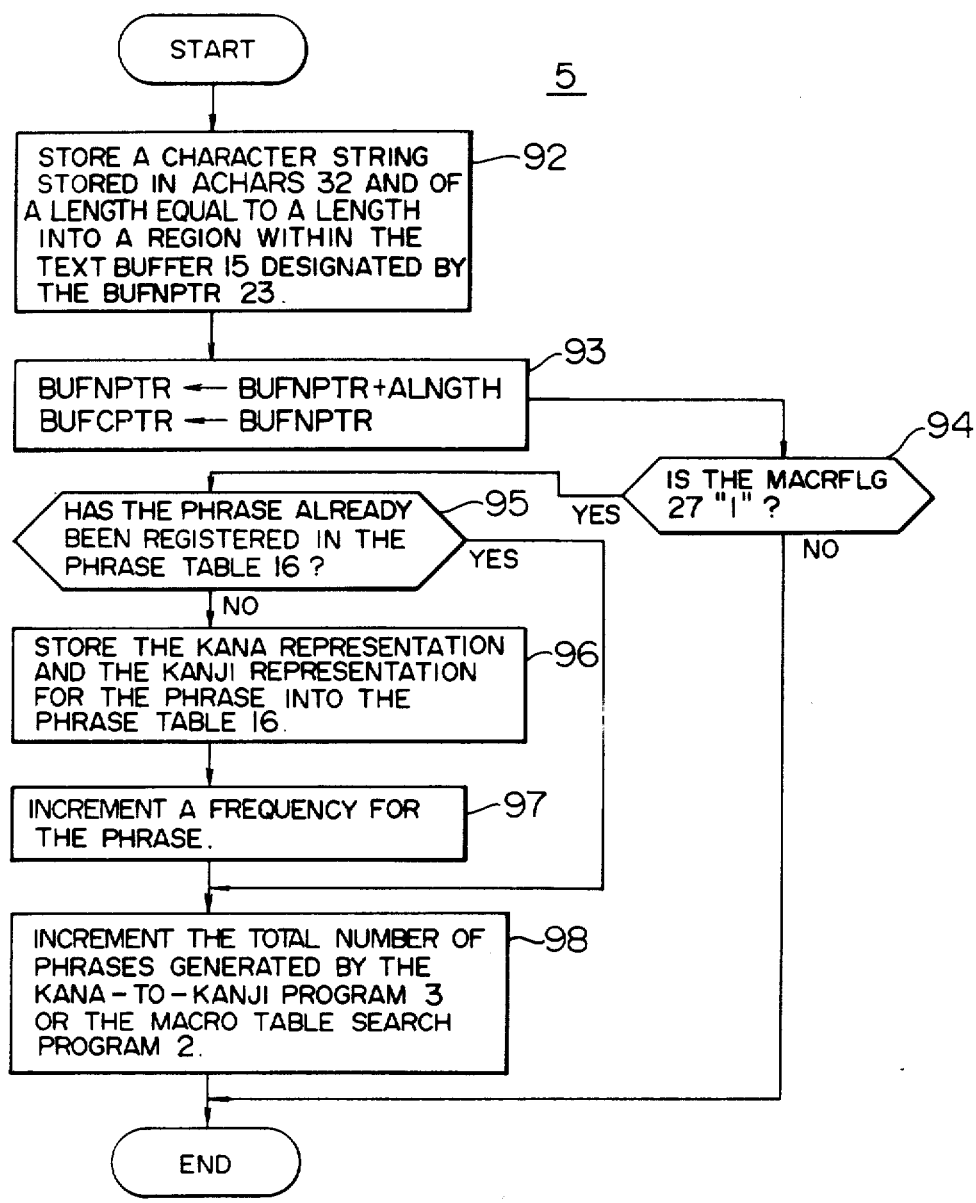
FIG. 11 is a flow chart of a phrase table frequency updating program.

Referring to FIG. 1, the phrase table updating program 5 is executed after the macro table search program 2 or the Kana-to-Kanji conversion program 3. FIG. 11 shows a flow chart of the processing by the program 5. In a step 92, the converted character string is stored in the text buffer 15. In a step 93, the content of the TBPTR 14 shown in FIG. 7A is corrected to determine a location in the text buffer 15 into which the character is to be stored next. In a step 94, the MACRFLG 27 in the PARMLIST 11 is checked to determine if the character string is the phrase or not. If it is the phrase, steps 95-97 are executed. Whether the generated phrase has already been registered in the phrase table or not is checked (step 95), and if it has not been registered, the Kana representation and the Kanji representation for that phrase are registered in the phrase table 16 (step 96) and the frequency of occurrence of that phrase in the phrase table 16 is incremented (step 97). Then, the total number of generated phrases is incremented (step 98).

Figure 9:
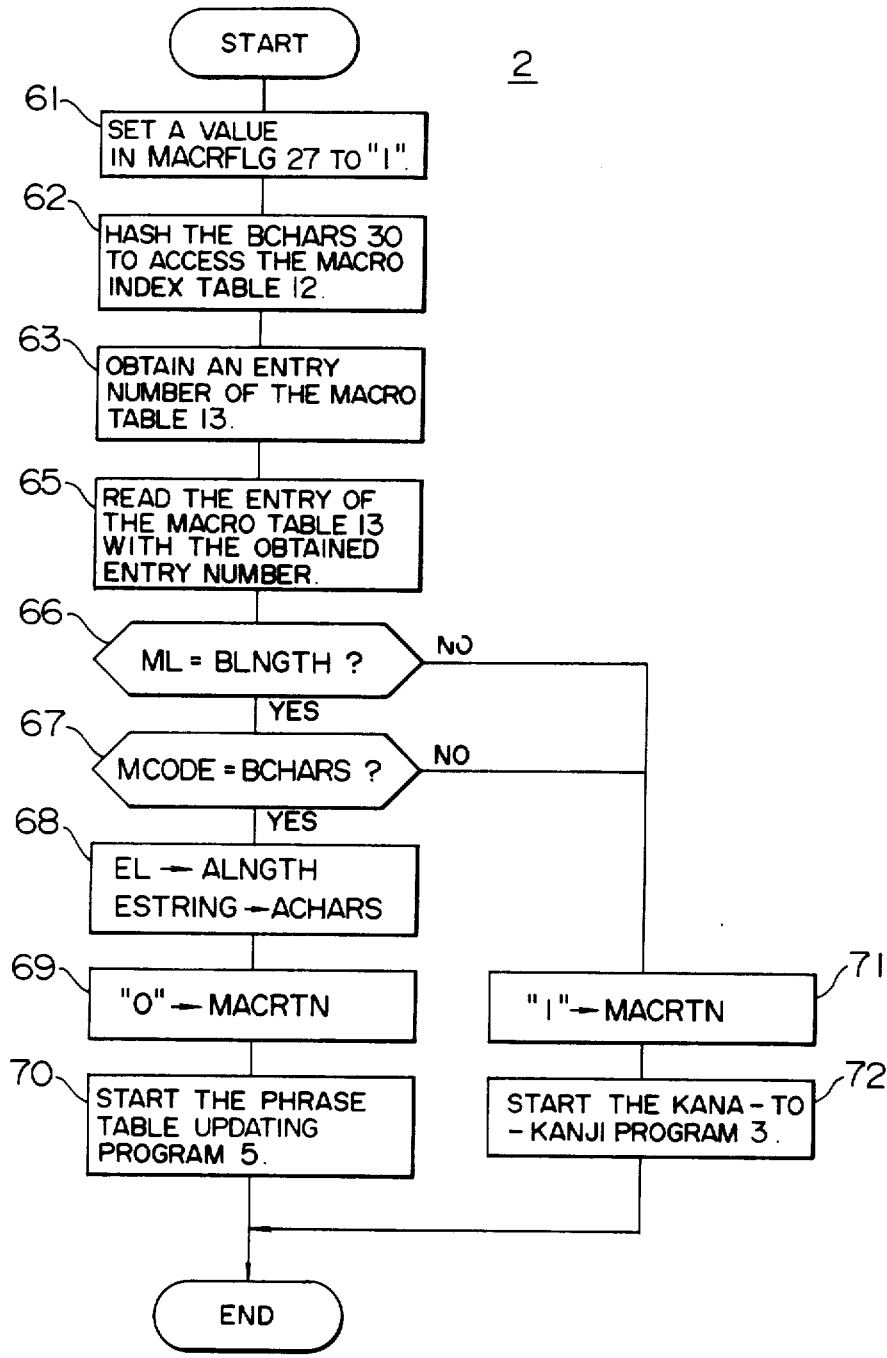
FIG. 9 is a flow chart of a macro table search program.

FIG. 9 shows a flow chart of the processing by the macro table search program 2. In a step 61, "1" is set in the MACRFLG to indicate the phrase. Then, the entry of the macro table 13 is read by the entry number obtained in the previous step (step 65), the coincidence between the ML 50 of the macro table 13 and the BLNGTH 29 of the parameter list 11 and the coincidence between the MCODE 51 and the BCHARS 30 are checked (steps 66 and 67), and if they are equal, the value of the EL 52 of the macro table 13 is written into the ALNGTH 31 of the parameter list 11 and the content of the ESTRING 53 is written into the ACHARS 32 (step 68). Finally, the MACRTN 28 of the parameter list 11 is set to "0" to indicate the success of the macro developments (step 69). The phrase table updating program 5 is started (step 70). If the decision in the step 66 or 67 is NO, the MACRTN 28 is set to "1" to indicate the failure of the macro development (step 71). The Kana-to-Kanji conversion program 3 is started (step 72).

The phrases registered in the macro table 13 can be displayed on the display screen 203 to display them to the user. For example, a list of all registered phrases and corresponding phrase keys or abbreviations may always be displayed in a window in one corner of the display screen 203. Alternatively, the list may be displayed only when a specific one of the function keys 206 is depressed, or only the altered content of the macro table 13 may be displayed. All or some of those display modes may be prepared and selected by the function keys 206.

While the above embodiments show the Kanji phrase, Hiragana phrases or foreign language words can be processed in a similar manner.

In accordance with the present invention, as the text is compared, the phrases which have high frequencies of occurrence are automatically registered. Accordingly, the user does not need to preregister the phrases by preparing a draft or making prediction, and can enjoy the input function by the macro codes while he/she composes the text directly by the text processor.

We claim:

1. In a text processor comprising input means for inputting a character string comprised of characters of a first type, macro table containing therein as pairs a phrases comprised of characters of a second type and macro codes corresponding to each phrase and comprised of character strings of characters of the first type, and conversion means for effecting a first conversion by searching said macro table based upon the input character string and selecting a phrase from among the phrases contained in the macro table corresponding to the character string inputted by said input means when the input character string is equal to one of the macro codes already contained in said macro table, and for effecting a second conversion by generating a single-character of the second type or a phrase comprised of characters of the second type, both having the same reading as that represented by the input character string when the input character string is not equal to any of the macro codes contained in the macro table;

a method for automatically registering frequently used phrases and macro codes therefor into said macro table, comprising steps of:

(a) repeatedly storing into a phrase table, phrases each generated by said second conversion for the input character string at least when a generated phrase is different from any of the phrases already stored in said phrase table;

(b) incrementing frequency-of-occurrence-data signals of each of the phrases already stored in the phrase table each time a phrase, the same as a phrase already stored in the phrase table, is generated by said second conversion;

(c) selecting, at predetermined timings, at least one phrase of the phrases already stored in the phrase table which satisfies a predetermined condition as to frequency of occurrence in order for the phrase to be registered in the macro table, in accordance with the frequency-of-occurrence-data signal of the phrases already stored in the phrase table;

(d) determining a macro code for the selected phrase so that the determined macro code differs from any of macro codes already registered in said macro table;

(e) registering as a pair the selected phrase and the determined macro code in the macro table; and (f) indicating the selected phrase and the determined macro code to an operator of the text processor.

2. A method for automatically registering frequently used phrases according to claim 1, wherein said step of storing phrases into the phrase table includes a step of storing as a pair the phrase selected by said conversion means and the input character for the selected phrase; and wherein said step of determining a macro code includes steps of:

extracting a predetermined number of leading characters from the inputted character string stored in the phrase table with the selected phrase;

detecting whether or not the extracted characters have already been registered in the macro table as a macro code for a different phrase;

adding to said leading characters a predetermined number of succeeding characters of the inputted character string stored in the phrase table with the selected phrase when the extracted characters are detected as having already been registered;

performing said detecting for the result of the adding; and repeating the adding and the detecting until a character string not registered as a macro code in the macro table is found.

3. A method for automatically registering frequently used phrases according to claim 1, wherein said registering step includes a step of selecting a phrase to be registered in the macro table in addition to phrases already registered in the macro table.

4. A method for automatically registering frequently used phrases according to claim 1, wherein said registering step includes a step of selecting a phrase to be registered in the macro table to replace phrases already registered therein.

5. A method for automatically registering frequently used phrases according to claim 4, wherein said registering step includes a step of selecting a phrase by said second conversion as a phrase to be additionally registered in the macro table when a value of the frequency of occurrence of the selected phrase exceeds a predetermined value.

6. A method for automatically registering frequently used phrases according to claim 1, wherein said registering step is carried out each time the total number of phrases generated in said first or second conversion reaches a predetermined value.

7. A method for automatically registering frequently used phrases according to claim 6, wherein said registering step includes a step of selecting a phrase from among the phrases already stored in the phrase table which is not yet registered in the macro table and having the highest frequency of occurrence among the phrases registered in the phrase table as the phrase to be additionally registered in the macro table.

8. A method for automatically registering frequently used phrases according to claim 6, wherein said registering step includes a step of selecting from a predetermined number of phrases from among the phrases already stored in the phrase table which have higher frequencies of occurrence than other phrases in the phrase table, as the phrases to be registered to replace phrases already registered in the macro table.

9. A method for automatically registering frequently used phrases according to claim 1, wherein said phrase selecting step is carried out each time the second conversion is effected.

* * * * *